US009799135B2

(12) United States Patent
Zhou et al.

(10) Patent No.: US 9,799,135 B2
(45) Date of Patent: Oct. 24, 2017

(54) SEMANTIC CINEMATIC VOLUME RENDERING

(71) Applicant: Siemens Healthcare GmbH, Erlangen (DE)

(72) Inventors: Shaohua Kevin Zhou, Plainsboro, NJ (US); Klaus Engel, Nürnberg (DE); David Liu, Franklin Park, NJ (US); Daphne Yu, Yardley, PA (US); Bernhard Geiger, Cranbury, NJ (US); Nathan Lay, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 14/842,280

(22) Filed: Sep. 1, 2015

(65) Prior Publication Data

US 2017/0061672 A1 Mar. 2, 2017

(51) Int. Cl.
*G06T 15/06* (2011.01)
*G06T 15/08* (2011.01)
*G06K 9/00* (2006.01)
*G06K 9/46* (2006.01)
*G06K 9/62* (2006.01)

(52) U.S. Cl.
CPC .......... *G06T 15/08* (2013.01); *G06K 9/00147* (2013.01); *G06K 9/4652* (2013.01); *G06K 9/6277* (2013.01)

(58) Field of Classification Search
USPC ....................................................... 345/424
See application file for complete search history.

(56) References Cited

U.S. PATENT DOCUMENTS

| 8,477,153 | B2* | 7/2013 | Lin ...................... G06T 17/20 |
| | | | 345/419 |
| 9,384,548 | B1* | 7/2016 | Wahrenberg ............ G06T 15/08 |
| 9,390,548 | B2* | 7/2016 | Schmidt .................. G06T 15/08 |
| 9,547,893 | B2* | 1/2017 | Couch ..................... A61B 6/032 |
| 9,589,373 | B2* | 3/2017 | Gindele ................ G06T 11/006 |
| 9,615,807 | B2* | 4/2017 | Bourland ............. A61B 6/5282 |
| 2003/0076987 | A1* | 4/2003 | Wilson ....................... G06T 7/60 |
| | | | 382/128 |
| 2007/0053553 | A1* | 3/2007 | Gerritsen ................ G06T 15/08 |
| | | | 382/128 |

(Continued)

OTHER PUBLICATIONS

Kroes, T., Post, F., Botha, C., "Exposure Render: An Interactive Photo-Realistic Volume Rendering Framework", pp. 1-10, vol. 7 No. 7, Jul. 2012.

(Continued)

*Primary Examiner* — Kimbinh T Nguyen (57) ABSTRACT

The present embodiments relate to cinematic volume renderings and volumetric Monte-Carlo path tracing. The present embodiments include systems and methods for integrating semantic information into cinematic volume renderings. Scan data of a volume is captured by a scanner and transmitted to a server or workstation for rendering. The scan data is received by a server or workstation. The server or workstation extracts semantic information and/or applies semantic processing to the scan data. A cinematic volume rendering is generated from the scan data and the extracted semantic information.

20 Claims, 7 Drawing Sheets

(56) References Cited

U.S. PATENT DOCUMENTS

| | | | | |
|---|---|---|---|---|
| 2008/0143718 A1* | 6/2008 | Ray | .................... | G06K 9/4638 |
| | | | | 345/424 |
| 2008/0225044 A1* | 9/2008 | Huang | .................. | G06T 17/00 |
| | | | | 345/420 |
| 2011/0311116 A1* | 12/2011 | Benn | ...................... | G06T 11/00 |
| | | | | 382/128 |
| 2012/0041685 A1* | 2/2012 | Ding | .................... | A61B 6/032 |
| | | | | 702/19 |
| 2012/0166462 A1* | 6/2012 | Pathak | .............. | G06F 3/04842 |
| | | | | 707/758 |
| 2012/0280686 A1* | 11/2012 | White | .................. | G01R 33/48 |
| | | | | 324/309 |
| 2014/0046170 A1* | 2/2014 | Sun | .................... | A61B 5/0073 |
| | | | | 600/411 |
| 2014/0218362 A1* | 8/2014 | Gindele | .............. | G06T 11/006 |
| | | | | 345/424 |
| 2015/0374276 A1* | 12/2015 | Farkas | ................ | A61B 5/444 |
| | | | | 600/407 |
| 2015/0374309 A1* | 12/2015 | Farkas | ................ | G01N 21/21 |
| | | | | 600/473 |
| 2016/0203599 A1* | 7/2016 | Gillies | ................ | A61B 6/463 |
| | | | | 382/132 |

OTHER PUBLICATIONS

Ropinski, T., Doring, C., Rezk-Salama, C., "Interactive Volumetric Lighting Simulating Scattering and Shadowing", pp. 169-176, Mar. 2010.
Rezk-Salama, C., "GPU-Based Monte-Carlo Volume Raycasting" Computer Graphics Group, University of Siegen, Germany, pp. 411-414, 2007.
U.S. Appl. No. 14/719,469, filed May 22, 2015.

* cited by examiner

SEMANTIC CINEMATIC VOLUME RENDERING

BACKGROUND

Figure 1A:
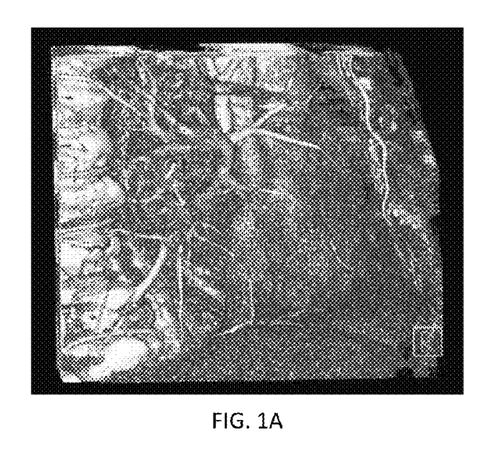
FIG. 1A illustrates an example of a conventional volume rendering.
Figure 1B:
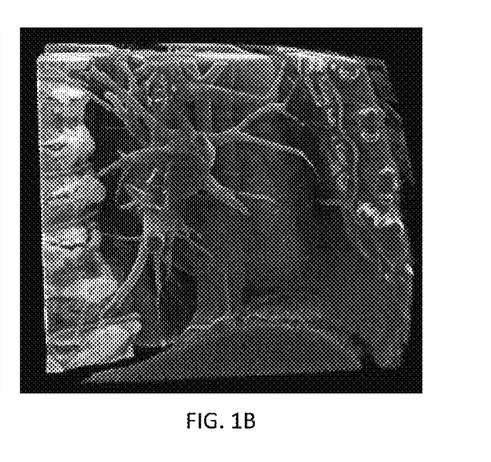
FIG. 1B illustrates an example of a cinematic volume rendering.

Cinematic volume rendering, or volumetric Monte-Carlo path tracing, is the next-generation volume rendering technology based on path tracing. Rather than integrating observations of a ray (i.e., ray tracing), cinematic volume rendering is based on path tracing that integrates all illuminance arriving to a single point on the surface of an object. The integrated illuminance is then reduced by a surface reflectance function in order to determine how much of the illuminance will travel to the viewpoint camera. Cinematic volume rendering also integrates over all other data points inside the volume (i.e., the direction of light may change in areas without an implicit surface due to scattering). The integration procedure is repeated for every pixel in the output image. By utilizing cinematic volume rendering, noise is largely suppressed and the structures of the volume renderings are greatly enhanced. Cinematic volume rendering and volumetric Monte-Carlo path tracing is described in PCT/EP2014/070231. FIGS. 1A and 1B illustrate example volume renderings generated by conventional volume rendering techniques (i.e., ray tracing) and by cinematic volume rendering techniques (i.e., path tracing), respectively. Cinematic volume rendering techniques, however, ignore semantic information that may be extracted from a medical image.

SUMMARY

The present embodiments relate to cinematic volume renderings and/or volumetric Monte-Carlo path tracing. By way of introduction, the present embodiments described below include systems and methods for integrating semantic information into cinematic volume renderings. A plurality of scan data, or voxels, of a volume are captured by a scanner and transmitted to a server or workstation for rendering. The scan data is received by a server or workstation. The server or workstation extracts semantic information and/or applies semantic processing to the scan data. A cinematic volume rendering is generated from the scan data and the extracted semantic information.

In a first aspect, a method for generating a volume rendering is provided. A server receives scan data of a volume over a network and extracts semantic information from the scan data. The server generates a volume rendering from the scan data and the extracted semantic information using volumetric Monte-Carlo path tracing.

In a second aspect, a method for generating a volume rendering is provided. A plurality of voxels representing a volume are received. Each voxel has three-dimensional coordinates and an image intensity associated with the voxel. Semantic processing is applied to one or more voxels to extract semantic information from the voxels. A volume rendering is generated based on the plurality of voxels and the associated semantic information by volumetric Monte-Carlo path tracing.

In a third aspect, a system for generating a volume rendering is provided. The system includes a scanner configured to capture scan data of a volume. A server is configured to receive the scan data of the volume from the scanner over a network and configured to extract semantic information from the scan data. The server is also configured to generate a volume rendering incorporating the semantic information using volumetric Monte-Carlo path tracing. The system may include a workstation that receives the generated volume rendering from the server over the network and configured to display the generated volume rendering.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EXEMPLARY EMBODIMENTS

The present embodiments integrate semantic information into the cinematic rendering engine. For example, semantic information may include material properties of the volume, surface characteristics, and scattering and/or information needed for applying an illumination model derived from the scan data. Further, this semantic information and processing may be performed in different orders (i.e., on different levels) and integrated by the cinematic rendering engine to provide desired result. Incorporating semantic information during cinematic volume rendering provides for image filtering, a location-dependent transfer function, a phase function database, and/or a semantics-encoded light model.

Integrating semantic information into cinematic volume renderings may enhance image quality of volume renderings and may enable new use applications for the volume renderings. Integrating semantic information may allow for anatomy-specific cinematic volume renderings when anatomy segmentation is performed. Integrating semantic information for tissue type classification into cinematic rendering may generate images with better perceived tissue separation. Integrating lesion, tumor, nodule, or other specialized feature maps into cinematic renderings may allow physicians to quickly inspect hot spots in the volume. Further, additional special-purpose renderings may be generated by integrating semantic information. For example, integrating special-purpose feature maps that highlight certain clinical information into cinematic rendering may generate images for additional clinical use cases.

Figure 2:
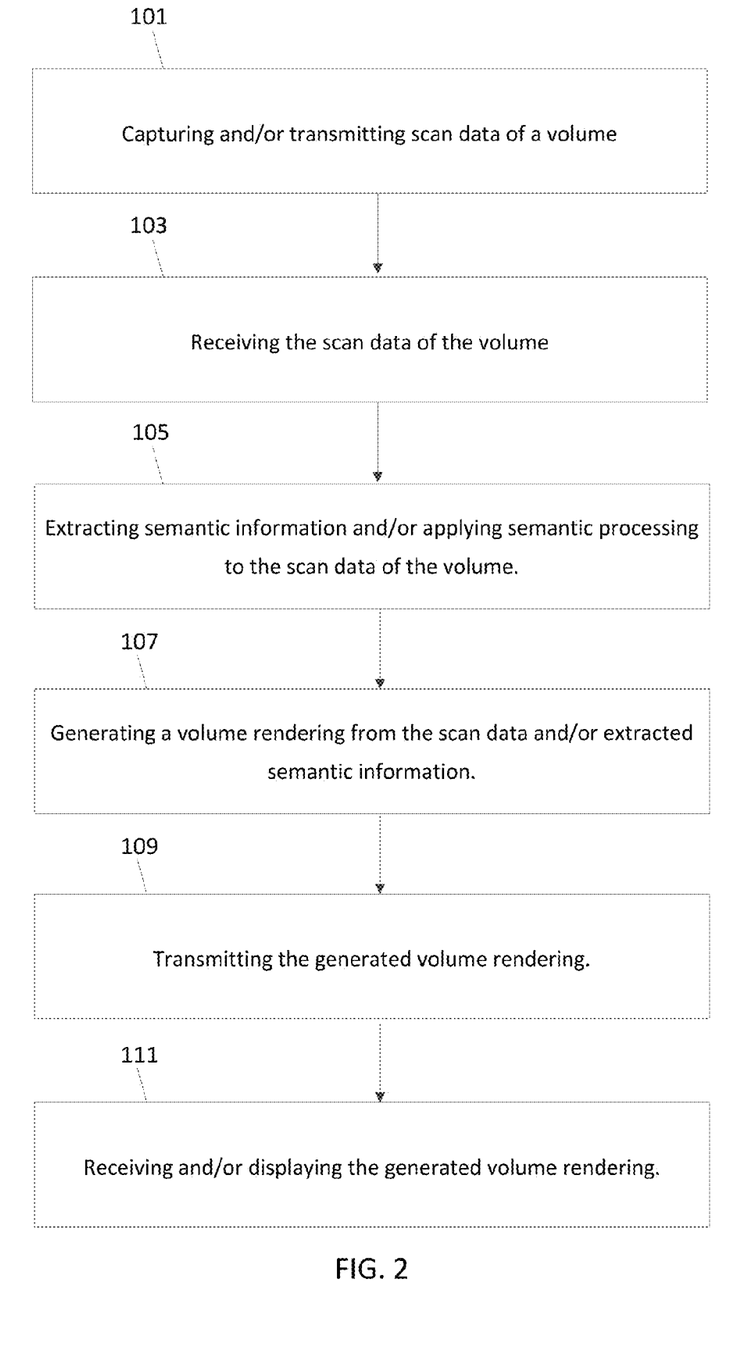
FIG. 2 illustrates a flowchart diagram of an embodiment of a method for semantic cinematic volume rendering.

FIG. 2 illustrates a flowchart diagram of an embodiment of a method for semantic cinematic volume rendering. The method is implemented by the system of FIG. 9 (discussed below) and/or a different system. Additional, different or fewer acts may be provided. For example, acts 101, 103, 109 and 111 may be omitted or performed by a separate systems. The method is provided in the order shown. Other orders may be provided and/or acts may be repeated. For example, act 107 may be repeated to extract additional semantic information or to apply additional semantic processing. Further, the acts may be performed concurrently as parallel acts. For example, acts 105 and 107 may be performed concurrently to generate a semantic cinematic volume rendering.

Figure 9:
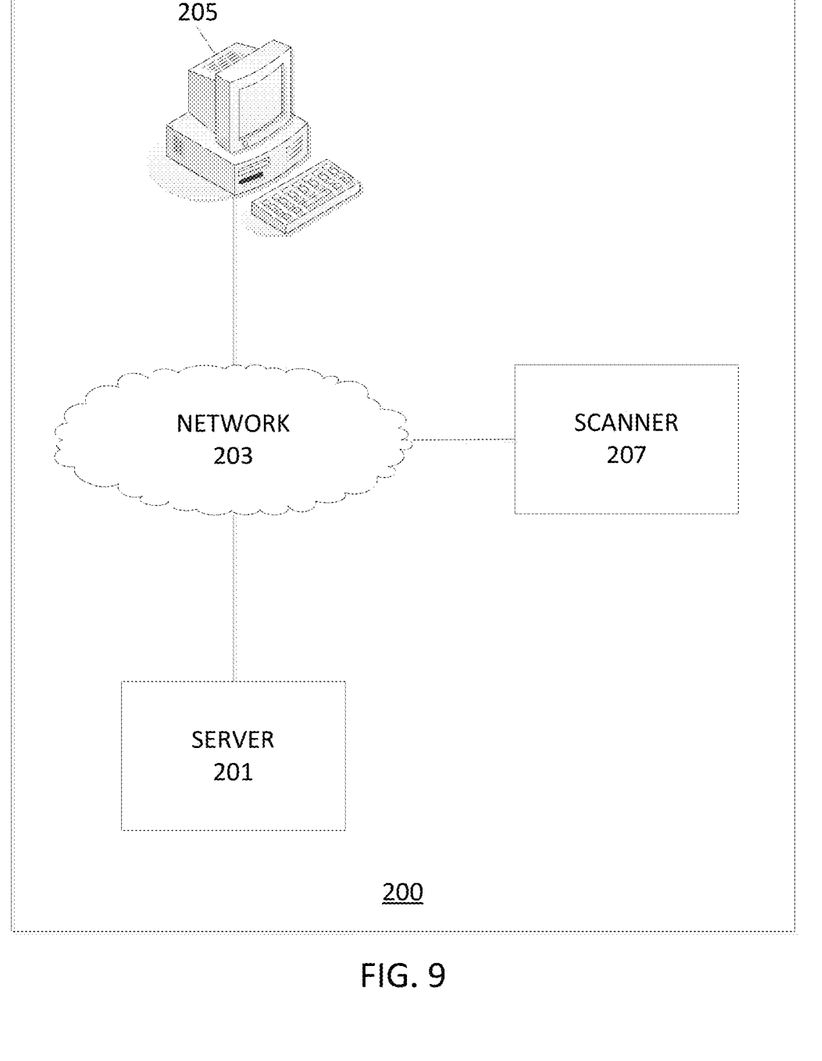
FIG. 9 illustrates an embodiment of a system for semantic cinematic volume rendering.

At act 101, a patient or other object (i.e., one or more volumes) is scanned to capture scan data of a volume. The scan data makes up a three-dimensional data set for the volume, and may be captured using computerized tomography (CT), magnetic resonance (MR) imaging or another scanning modality. For example, the scan data may be voxels, where each voxel is represented by voxel coordinates (x, y, z) and an image intensity (i). At act 101, the scan data is transmitted from the scanner 207 to a server 201, or to a workstation 205, over a network 203. At act 103, the scan data is received by the server 201 or the workstation 205.

At act 105, semantic information is extracted from the scan data. For example, semantic processing is applied to one or more voxels to extract semantic information from the voxels. Semantic information may include material properties of the volume and surface characteristics of the volume, and semantic processing may include applying an illumination (i.e., light) model based on semantic information extracted from the scan data. Additional or different semantic information may be extracted from the scan data, and/or additional or different semantic processing may be applied to data.

Figure 3A:
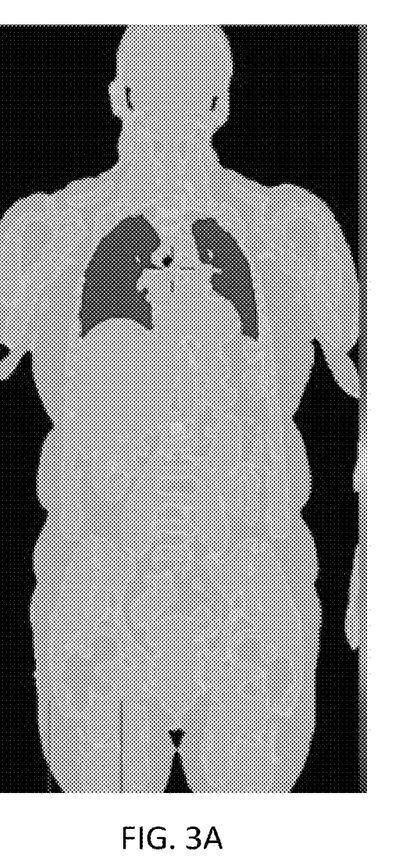
FIGS. 3A and 3B illustrate examples of extracted semantic tissue type classifications.
Figure 3B:
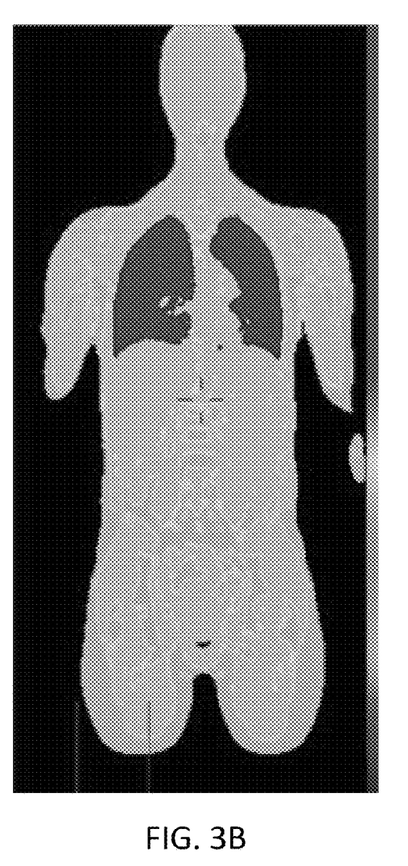

In an embodiment, the voxels may be classified according to tissue type classifications. In this embodiment, each voxel is assigned a classification. Any tissue classification may be used, such as soft tissue, fluid, or bone. In one embodiment, the classification includes: air; soft tissue (e.g., fat, muscle, etc.); iodine or contrasted vessels; and bone. A classification confidence may also be assigned to the voxel, indicating likelihood that the voxel is classified correctly. FIGS. 3A and 3B illustrate examples of extracted semantic tissue type classifications. For example, FIGS. 3A and 3B depict examples of classification maps (e.g., fat, soft tissue, air, and lung) automatically extracted from MR scan data using Dixon techniques. Different colors or intensity represent different classification. Additional, different or fewer semantic classifications may be may be provided.

Figure 4A:
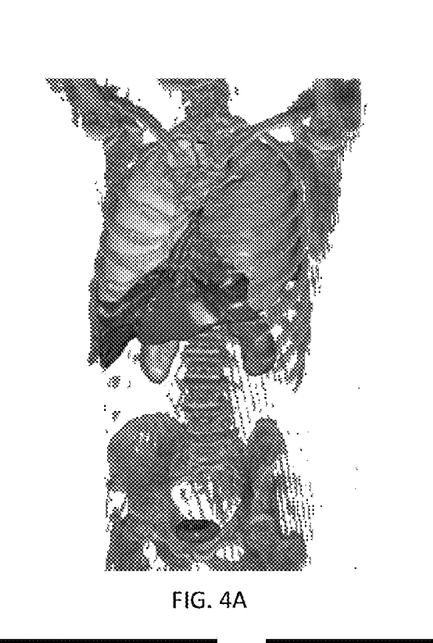
FIGS. 4A and 4B illustrate examples of extracted organ segmentations.
Figure 4B:
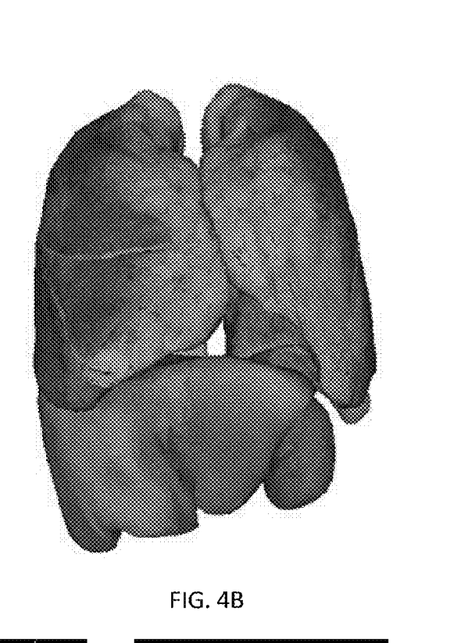
Figure 5A:
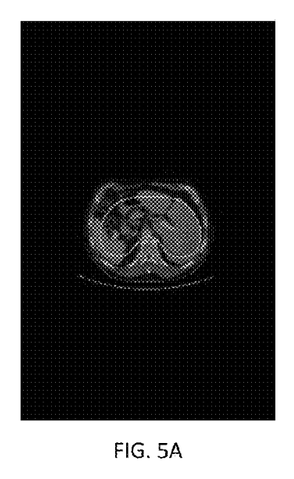
FIGS. 5A, 5B and 5C illustrate examples of extracted skeleton masks.
Figure 5B:
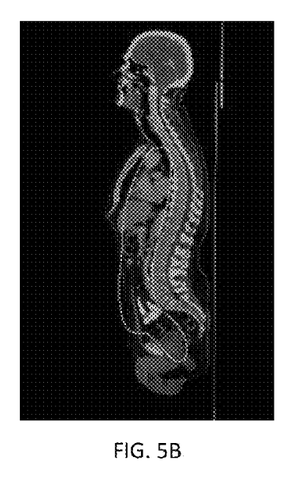
Figure 5C:
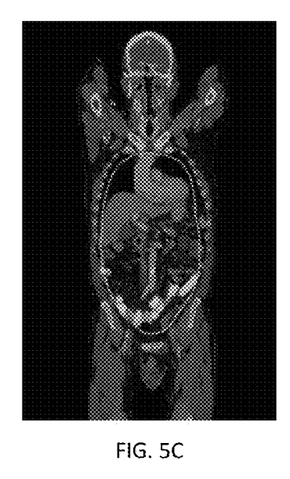
Figure 6A:
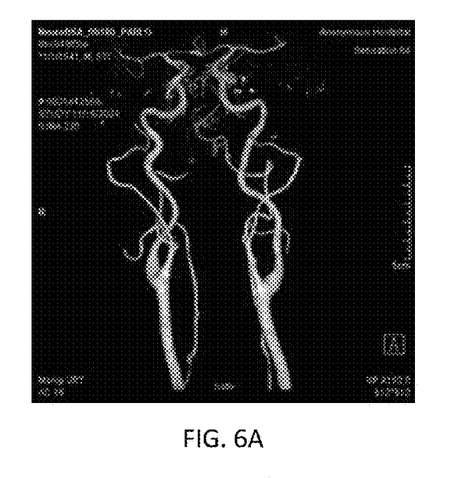
FIGS. 6A and 6B illustrate examples of extracted iodized vessel masks.
Figure 6B:
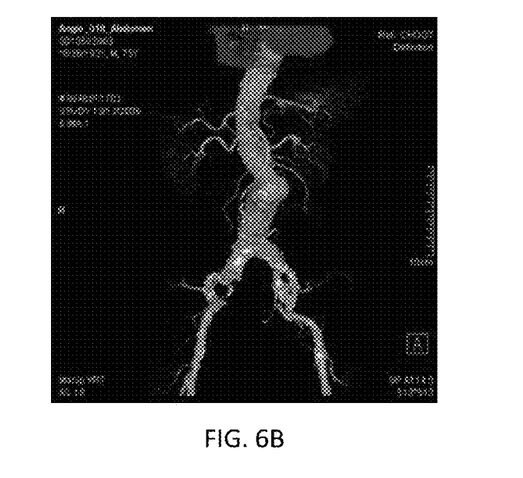

The voxels may be segmented based on anatomical structures (i.e., segmentation of specific volumes or tissue types). In this embodiment, each anatomical structure (e.g., such as organ or bone) is segmented from the other voxels based on the semantic information extracted from scan data. For example, automatic segmentation is performed for each anatomical structure (or simultaneously for multiple structures), and each segmented structure is described using one or more binary mask(s) or level set function(s). A segmentation confidence score may also be assigned to the segmented voxels. Various types of segmentation may be performed, such as organ segmentation, skeleton segmentation or vessel segmentation. For example, FIGS. 4A and 4B illustrate examples of extracted organ segmentations automatically extracted from a CT scan data. In another example, FIGS. 5A, 5B and 5C illustrate examples of segmented skeleton masks automatically extracted from a CT scan data. In a further example, FIGS. 6A and 6B illustrate examples of segmented iodized vessel masks automatically extracted from a CT scan data. Additional, different or fewer segmentation schemas may be may be provided.

Figure 7A:
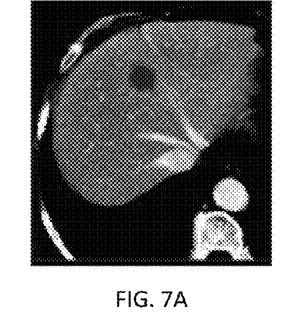
FIGS. 7A, 7B and 7C illustrate examples of extracted tumor hot maps.
Figure 7B:
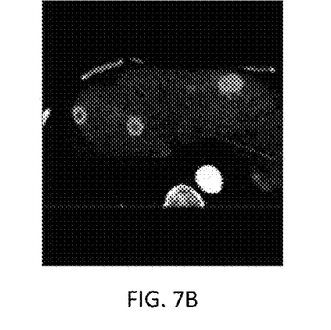
Figure 7C:
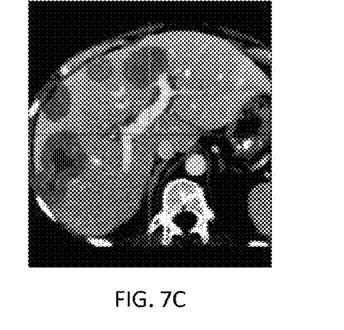

In another embodiment, extracted semantic information may be used to encode or apply a light model using the scan data to produce a lesion, tumor, nodule or other specialized feature map (e.g., hot map). For example, semantic information may be extracted from the scan data to identify biological structures or activity (e.g., using positron emission tomography (PET), single-photon emission computed tomography (SPECT), CT scanning, MR scanning, etc.). The extracted biological information is then treated as a source of illumination (e.g., a light source). The light sources are used to generate feature maps based on the biological information extracted as semantic information. In this embodiment, extracting semantic information and applying semantic processing may include two or more levels of semantic extraction and/or processing performed on the scan data. For example, automatic structure detection and segmentation may be performed first, followed by lesion, tumor and/or nodule (biological) information extracted to generate binary mask(s) or level set function(s). A confidence score may be assigned with the binary mask(s) or level set function(s). Alternatively, lesion, tumor and/or nodule (biological) information may be extracted (e.g., with a feature extraction module that highlights the lesions) and then directly storing the biological information in a feature response map. For example, FIGS. 7A, 7B and 7C illustrate examples of liver lesion feature maps automatically extracted from CT scan data.

Additional or different illumination models may be applied to the scan data. For example, semantic information may be extracted for special-purpose feature maps. Other semantic features and biological information (e.g., similar to lesion features) are extracted from the scan data. In one example, in treating trauma patients, identifying air bubbles may be useful during treatment. In this example, semantic information is extracted to generate air bubble feature maps. Additional and different feature maps may be provided. Further, as discussed above, extracting semantic information and applying illumination models may include two or more levels of semantic extraction and processing.

In one or more embodiments, extracting semantic information or performing semantic processing, as described above, associates one or more labels with the voxels. For example, one or more semantic labels are associated with one or more voxels. Further, a semantic probability may be associated with each semantic label. For example, each voxel is associated with one or more semantic labels (e.g., tissue type, anatomic type, lesion type, etc.) along with probabilities for each label. As discussed above, each voxel may be represented by a voxel coordinate (x, y, z) and an image intensity (i). In this example, after semantic processing, each voxel is represented by following tuple with varying length:

$$(x, y, z, i, I_1, p_1, I_2, p_2, \ldots, I_n, p_n)$$

Where: (x, y, z) is the voxel coordinate; (i) is the image intensity; $(I_1, p_1)$ is label 1 and probability 1; $(I_2, p_2)$ is label 2 and probability 2; . . . ; and $(I_n, p_n)$ is label n and probability n. In an example, semantic labeling associates a material property to each voxel, and the image intensity and the material property labels are used to generate a transfer function and/or to apply a light model for the voxels. In another example, semantic labeling associates a surface property to each voxel, and the image intensity and the surface property label are used to generate a phase function for the voxels. Additional, different or fewer labels may be used to generate the cinematic volume rendering.

Figure 8:
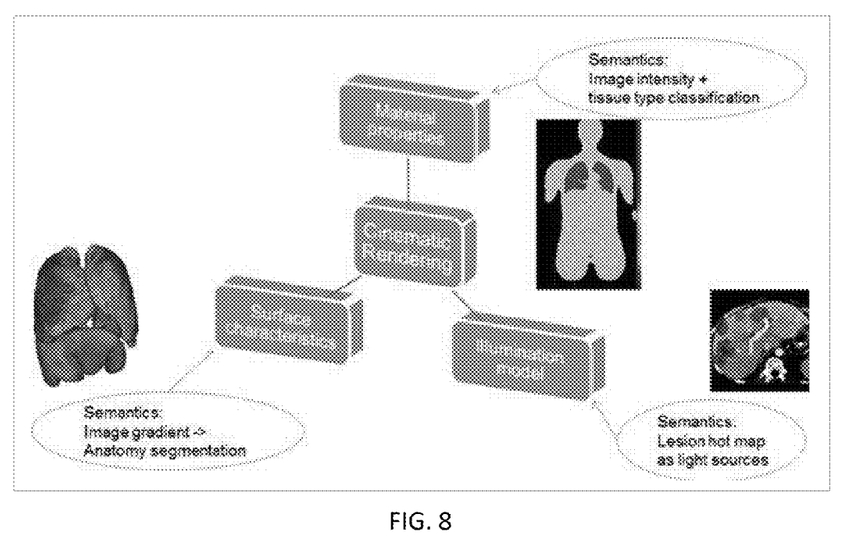
FIG. 8 illustrates an embodiment of integrating extracted semantic information into a cinematic volume rendering.

At act 107, a semantic cinematic volume rendering is generated from the scan data and the extracted semantic information. As discussed above, cinematic volume renderings are generated using volumetric Monte-Carlo path tracing. Semantic cinematic volume renderings integrate the extracted semantic information using the cinematic rendering engine. FIG. 8 illustrates an embodiment of integrating extracted semantic information into a cinematic volume rendering. Integrating semantic information may incorporate semantic information extracted from different levels of extraction. As depicted in FIG. 8, the cinematic rendering engine integrates semantic information regarding one or more of the following components of cinematic volume rendering: material properties; surface characteristics and scattering; and/or an illumination model.

In an embodiment, semantic information (e.g., tissue type classification) is used in place of, or to supplement, the image intensity of the voxels. In the cinematic volume rendering, image intensity is used as a surrogate for material properties of the volume. In semantic cinematic volume rendering, image filtering is performed during volume rendering using the material properties extracted from the scan data (e.g., the extracted semantic information is used to filter the original image data to obtain new filtered image data). The new filtered image data includes extracted material properties for the volume that are used during the cinematic rendering. In this example, because the material properties are implicitly associated with image intensity (e.g., at least in a CT scan), image filtering adjusts the material properties used during cinematic rendering.

In another embodiment, a location-dependent transfer function is incorporated into the cinematic volume rendering. A transfer function in volume rendering techniques provides a static lookup table that maps the image intensity values of the scan data to describe the color and opacity (e.g., red green blue alpha (RGBA) values) in the volume. Conventional transfer functions are static and location-independent (e.g., based on the image intensity). By incorporating semantic information, a semantic transfer function is location-dependent (e.g., by taking into consideration the available tissue type semantic information). For example, an extracted material property for each location in the volume is known and stored in the transfer function. Using the semantic information for each location in the transfer function (e.g., tissue type, etc.), color and opacity values for the volume are adjusted for each location, providing a location-dependent transfer function.

In another embodiment, a semantic phase function is incorporated into the cinematic volume rendering. Conventionally, phase functions are derived from image intensity values. A phase function describes the probability of light changing its path in each direction for a given material. By incorporating semantic information, phase functions are enhanced by the extracted semantic information (e.g., by the extracted surface characteristics and material properties of the volume). A database of phase functions is used for each material type (e.g., tissue type, bone type, etc.), and a specific phase function for each material type is identified from the extracted semantic information to better influence scattering events in the Monte-Carlo integration (e.g., using the enhanced the phase function).

In another embodiment, a semantic light model is incorporated into the cinematic volume rendering. The extracted semantic information is used to encode a light model (e.g., a feature hot map) based on the scan data. Cinematic rendering then incorporates the semantics-encoded light model (e.g., as a source of light) to generate the cinematic volume rendering.

In yet another embodiment, different types of semantic information are combined to generate the cinematic volume rendering. For example, two or more of image filtering, a location-dependent transfer function, a semantic phase function, and/or a semantic light model are incorporated into the cinematic volume rendering. Additional and different semantic information may be combined to generate the cinematic volume rendering.

At act 109, the generated volume rendering is transmitted from the server 201 over the network 203. At act 111, the generated volume rendering is received by the workstation 205 and the workstation 205 displays the generated volume rendering. Alternatively, a workstation performs the acts and the resulting rendering is displayed at the workstation.

FIG. 9 illustrates an embodiment of a system for generating a semantic cinematic volume rendering. The system 200 includes a server 201, a network 203, a workstation 205 and a scanner 207. Additional, different, or fewer components may be provided. For example, additional servers 201, networks 203, workstations 205 and/or scanners 207 are used. In another example, the servers 201 and the workstation 205 are directly connected, or implemented on a single computing device. In yet another example, server 201, workstation 205 and scanner 207 are implemented on a single scanning device. As another example, the workstation 205 is part of the scanner 207.

The system 200 includes a scanner 207 configured to capture scan data of a volume. The scanner 207 is a three-dimensional scanner, such as a computerized tomography (CT), ultrasound, x-ray, or magnetic resonance (MR) scanner. Other scanners may be used.

The system 200 includes a network 203. The network 203 is a wired or wireless network, or a combination thereof. Network 203 is configured as a local area network (LAN), wide area network (WAN), intranet, Internet or other now known or later developed network configurations. Any network or combination of networks for communicating between the client computer 205, the scanner 207 and the server 201 may be used.

The system 200 includes server 201. The server 201 is a server computer platform having hardware such as one or more central processing units (CPU), a system memory, a random access memory (RAM) and input/output (I/O) interface(s). The server 201 also includes a graphics processor unit (GPU) to accelerate image rendering. The server 201 is implemented on one or more server computers connected to network 203. Additional, different or fewer components may be provided.

The server 201 is configured to execute an application to receive scan data of a volume from the scanner 207 over the network 203. The server 201 is further configured to execute an application (e.g., a semantic module) to extract semantic information from the scan data. The server 201 is further configured to execute an application (e.g., a cinematic rendering module or rending engine) to generate a cinematic volume rendering incorporating the semantic information using volumetric Monte-Carlo path tracing. The server 201 is configured to transmit the generated volume rendering to the workstation 205 over the network 203. In alternative embodiments, the extraction, rendering, and/or transmission are performed by separate processors or devices.

The system 200 includes a workstation 205. The workstation 205 is configured to execute an application to receive the generated volume rendering from the server 201 over the network 203. The workstation is further configured to execute an application to display the generated volume rendering.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. A method for generating a volume rendering, the method comprising:
   receiving, by a server over a network, a three-dimensional data set of a volume;
   extracting, by the server, semantic information from the three-dimensional data set;
   generating, by the server, a volume rendering from the three-dimensional data set and from the extracted semantic information, wherein generating the volume rendering comprises performing volumetric Monte-Carlo path tracing using the three-dimensional data set and integrating the extracted semantic information; and
   displaying the generated volume rendering.

2. The method of claim 1 wherein extracting semantic information comprises extracting material properties of the volume from the three-dimensional data set.

3. The method of claim 2 wherein extracting material properties comprises associating the three-dimensional data with tissue classifications.

4. The method of claim 1 wherein extracting semantic information comprises extracting surface characteristics of the volume from the three-dimensional data set.

5. The method of claim 4 wherein extracting surface characteristics comprises segmenting a structure of the volume from the three-dimensional data set.

6. The method of claim 1 wherein extracting semantic information comprises extracting semantic information from the three-dimensional data set to apply an illumination model.

7. The method of claim 6 wherein applying the illumination model comprises generating a feature map for the volume from the three-dimensional data set.

8. The method of claim 7 wherein generating a feature map comprises generating a hot spot map.

9. The method of claim 1 wherein extracting semantic information comprises two or more levels extraction performed on the three-dimensional data set, wherein the levels of extraction comprise two or more of:
   extracting material properties of the volume from the three-dimensional data set;
   extracting surface characteristics of the volume from the three-dimensional data set; and
   extracting semantic processing from the three-dimensional data set to apply an illumination model.

10. A method for generating a volume rendering, the method comprising:
    receiving a plurality of voxels representing a volume, wherein each voxel has three-dimensional coordinates and an image intensity associated with the voxel;
    applying semantic processing to one or more voxels to extract semantic information from the voxels;
    generating a volume rendering based on the plurality of voxels and the extracted semantic information, wherein generating the volume rendering comprises performing volumetric Monte-Carlo path tracing using the three-dimensional data set and the extracted semantic information; and
    displaying the generated volume rendering.

11. The method of claim 10 wherein applying semantic comprises associating a material property, associating a surface characteristic or applying illumination model to the voxels.

12. The method of claim 10 wherein associating one or more voxels with semantic information comprises labeling the voxels with one or more semantic labels.

13. The method of claim 12 wherein labeling the voxel further comprises labeling each voxel with a semantic probability associated with each semantic label.

14. The method of claim 10, wherein applying semantic processing comprises filtering the voxels based the image intensity associated with the voxel, wherein filtering the voxels comprises labeling each voxel with a semantic label.

15. The method of claim 14, wherein labeling each voxel with a semantic label comprises labeling each voxel with a material property, wherein the image intensity and the material property label are used to generate a transfer function for the voxels.

16. The method of claim 14, wherein labeling each voxel with a semantic label comprises labeling each voxel with a surface property, wherein the image intensity and the surface property label are used to generate a phase function for the voxels.

17. The method of claim 14, wherein labeling each voxel with a semantic label comprises labeling each voxel with a material property, wherein the material property label is used to apply a light model to the voxels.

18. The method of claim 17, wherein applying a light model to the voxels generates a feature map.

19. A system for generating a volume rendering, the system comprising:
    a scanner configured to capture scan data of a volume; and
    a server configured to:
      receive, from the scanner over a network, the scan data of a volume;
      extract semantic information from the scan data, wherein the semantic information comprises a material property, a surface characteristic or an illumination property; and
      generate, using volumetric Monte-Carlo path tracing, a volume rendering incorporating the semantic information.

20. The system of claim 19 further comprising:
    a workstation configured to:
      receive, from the server over the network, the generated volume rendering; and
      display the generated volume rendering.

* * * * *